Aug. 17, 1965   L. D. WILLMON   3,200,422
METHOD OF FORMING A SCREW WITH A SLOT IN THE SHANK
Filed July 9, 1962

INVENTOR:
L. D. Millmon

By Smyth, Roston & Pavitt
Attorneys

United States Patent Office 3,200,422
Patented Aug. 17, 1965

3,200,422
METHOD OF FORMING A SCREW WITH A SLOT IN THE SHANK
L. D. Willmon, Montclair, Calif., assignor to Long-Lok Corporation, Los Angeles, Calif., a corporation of California
Filed July 9, 1962, Ser. No. 208,233
2 Claims. (Cl. 10—10)

This invention relates to a procedure for fabricating a screw with a peripheral recess in the threaded shank of the screw. While the invention is widely applicable for its purpose, it has special utility for fabricating a screw with a longitudinal groove in its threaded shank to receive a deformable insert, such as a plastic insert, to convert the screw into a self-locking screw. This particular application of the invention has been selected for the purpose of the present disclosure and will provide adequate guidance for other specific applications of the invention.

The heretofore prevalent method of forming a longitudinal groove in a screw shank for the purpose of receiving an insert has been to remove or cut material from a shank of the finished screw. In a typical procedure a thin rotary tool with peripheral cutting teeth traverses the screw shank longitudinally thereof in the region of the desired groove.

One disadvantage of the conventional procedure is that a blind end of the groove, i.e. an end of the groove that does not open onto the end of the screw, is necessarily an end of curved taper because the cutting tool is circular. One of the problems encountered in putting to use a screw that employs an insert in a groove for self-locking action is that the insert is subjected to longitudinal forces with a strong tendency for the insert to slide along the groove and even entirely out of the groove. The tapered end of a machined groove facilitates such longitudinal slippage. For this reason some inserts are adhesively bonded against longitudinal slippage at additional expense and in other instances the trouble is taken to interlock the insert with the adjacent cut ends of the turns of the screw thread.

This difficulty of longitudinal slippage of the insert in the groove can be met by using an insert with a square cut and in a groove that has a correspondingly abrupt end, i.e. an end with a radial face to abut the square cut end of the insert. Such a square end groove can be formed by machining but only at an increase in cost which is prohibitive for many uses of self-locking screws.

Another disadvantage of machining a groove in a finished screw is that the cutting away of the metal to form two groove surfaces that meet at right angles to each other may create microscopic fractures at the juncture of the two surfaces, which fractures tend to spread when the screw is subsequently stressed in service. A still further disadvantage is that the machining operation forms undesirable minute burrs along the groove.

The present invention meets this situation by abruptly displacing the metal of the screw shank with flow action instead of cutting away the metal. It has been discovered that abruptly forcing a forming tool into the material of a screw shank causes displacement flow to produce a groove of desirable configuration and that suitably confining the screw shank during this operation causes the displacement flow to occur circumferentially in opposite directions. Consequently the screw retains its circular cross sectional configuration to a surprising degree and at the same time increases in diameter in accord with the magnitude of the displacement. The process may be varied to meet various tolerance requirements.

Where liberal tolerances in the finished dimensions of a screw are permitted, the screw may be fabricated in the usual manner with the thread formed by a rolling operation and with the threaded shank of uniform diameter. The screw is then confined in an internally threaded forming cavity that conforms to the configuration of the screw shank but is of slightly larger diameter to allow for the displacement of material to form the desired groove. Impact force is then applied to drive a forming tool into the material of the confined screw shank to displace material for forming the desired groove. The confined displacement of the material slightly increases the local cross dimension of the screw and the consequently enlarged shank portion may be slightly out of round but neither of these effects may exceed the permitted liberal tolerance of a Class-2 screw (Government Handbook H).

For the more strict tolerance requirements of a Class 2–A screw, the minute departure from precise roundness is within limits but the local enlargement of the screw shank is not permissible. It has been discovered, however, that if the shank of the screw blank prior to the thread rolling operation is suitably reduced in diameter in the region of the intended groove, the subsequent displacement of material to form the groove will restore the local diameter to result in a finished screw of substantially uniform diameter that is well within the tolerance of a Class 2–A screw.

For the production of a precision screw with even less tolerance, such as a Class 3–A screw, the groove is formed in the unthreaded screw blank by displacing the metal while the unthreaded screw shank is suitably confined to direct the displaced metal circumferentially. Then the screw thread is formed on the grooved shank by a grinding operation. Since the grinding operation removes all surplus material, it is not necessary to reduce the diameter of the screw blank locally in the region of the intended slot prior to the forming of the slot but reduction in the local diameter is preferred to minimize the quantity of material that must be removed by the grinding operation.

The features and advantages of the invention may be understood from the following detailed description and the accompanying drawing.

In the drawing, which is to be regarded as merely illustrative:

Figure 1:
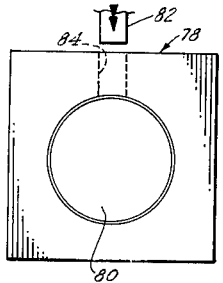
FIG. 1 is an end elevation of a forming means for displacing metal to provide a longitudinal groove in a screw.
Figure 2:
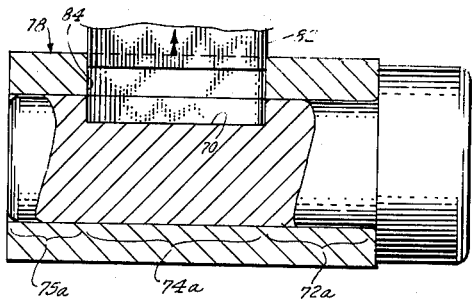
FIG. 2 is a longitudinal sectional view showing how the unthreaded shank of the screw blank is processed in the forming means to produce the desired longitudinal groove.
Figure 3:
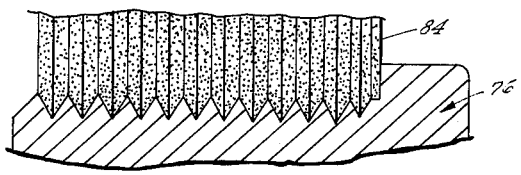
FIG. 3 is a fragmentary view partly in section and partly in side elevation showing how the screw blank with the longitudinal groove therein may be formed with a screw thread by a grinding operation to produce a high precision screw.
Figure 4:
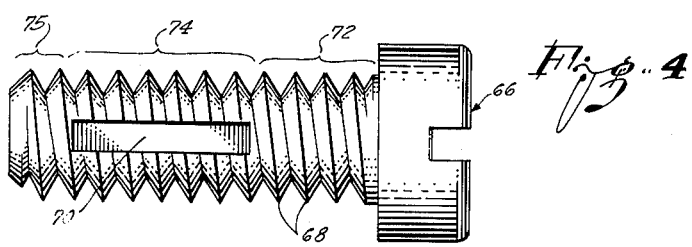
FIG. 4 is a plan view of the finished high precision screw.

FIGS. 1–4 illustrate the manner in which the invention may be applied to the production of a finished screw designated 66 in FIG. 4, which is a precision Class 3–A screw having a screw thread 68 and a longitudinal peripheral groove 70 spaced from its leading end. Thus the finished screw 66 has a first shank portion 72 in which the screw thread 68 is continuous, a second intermediate shank portion 74 in which the screw thread is interrupted by the groove 70 and a third end shank portion 75 in which the screw thread is continuous.

A screw blank generally designated 76 in FIG. 2 is dimensioned to produce the finished screw 66. The unthreaded screw blank 76 has three shank portions 72a, 74a and 75a which correspond to the shank portions 72, 74 and 75 of the finished screw. The two shank portions 72a and 75a have the same diameter which is dimensioned in anticipation of a grinding operation to produce the finished screw thread 68. The intermediate longitudinal portion 74a is of slightly less diameter in anticipation of the formation of the groove 70 but the lesser diameter is not apparent in FIG. 2 because the view shows the screw blank after the groove 70 is formed therein.

FIG. 2 shows how the groove 70 may be formed by using a forming means, generally designated 78, of the character heretofore described having a forming cavity 80 in the form of a smooth uniform bore of a diameter to receive the two shank portions 72a and 75a in a snug manner. A displacement member 82 slidingly mounted in the usual radial guideway 84 is employed to form the groove 70, the displacement member being shown in the course of its retraction movement after the groove is formed. The displacement of the metal to form the groove 70 expands the shank portion 74a to substantially the same diameter as the adjacent shank portions 72a and 75a. Preferably the screw blank is slightly oversize at this stage so that it may be reduced to the precise desired diameter by grinding. As indicated in FIG. 3, a grinding means 84 is then employed to form the screw thread 68 in a conventional manner.

My description in specific detail of the selected practices of the invention will suggest various changes, substitutions and other departures from my disclosure within the spirit and scope of the appended claims.

I claim:

1. A method of accurately fabricating a screw of a given diameter with a longitudinal peripheral groove in a shank portion of the screw to seat an insert, characterized by the steps of:

forming a blank screw with a shank portion that is oversized with respect to said diameter;

confining said shank portion of the blank screw in a cavity of the same configuration as the shank portion of the blank screw but of slightly larger diameter to compensate for the cross sectional area of the desired groove;

driving into the material of the confined shank portion a forming member, the transverse cross section of which is the same as the longitudinal cross section of the groove, to form the groove in the shank portion by displacement of the material with the displacement confined circumferentially by the surrounding wall of the cavity and with consequent increase in the diameter of the shank portion; and then removing the excess material of the shank portion and at the same time forming a screw thread on the shank portion by a grinding operation.

2. A method of accurately fabricating a screw of a given diameter with a recess in a shank portion of the screw to seat an insert, characterized by the steps of:

forming a blank screw with a shank portion that is oversized with respect to said diameter;

confining said shank portion of the blank screw in a cavity of the same configuration as the shank portion of the blank screw but of slightly larger diameter to compensate for the cross sectional area of the desired recess;

driving into the material of the confined shank portion a forming member, the transverse cross section of which is the same as the cross section of the recess, to form the recess in the shank portion by displacement of the material with the displacement confined circumferentially by the surrounding wall of the cavity and with consequent increase in the diameter of the shank portion; and then removing the excess material of the shank portion and at the same time forming a screw thread on the shank portion by a grinding operation.

References Cited by the Examiner

UNITED STATES PATENTS

| | | | |
|---|---|---|---|
| 967,768 | 8/10 | Heller | 10—10 |
| 2,098,145 | 11/37 | Harley | 51—288 |
| 2,956,293 | 10/60 | McKay et al. | 10—10 |
| 3,020,570 | 2/62 | Wallace et al. | 10—10 |
| 3,150,702 | 9/64 | Buckley et al. | 10—10 |

ANDREW R. JUHASZ, *Primary Examiner.*